July 9, 1940. F. C. LEONARD ET AL 2,206,905
FLOW CONTROL MECHANISM
Filed Oct. 31, 1936
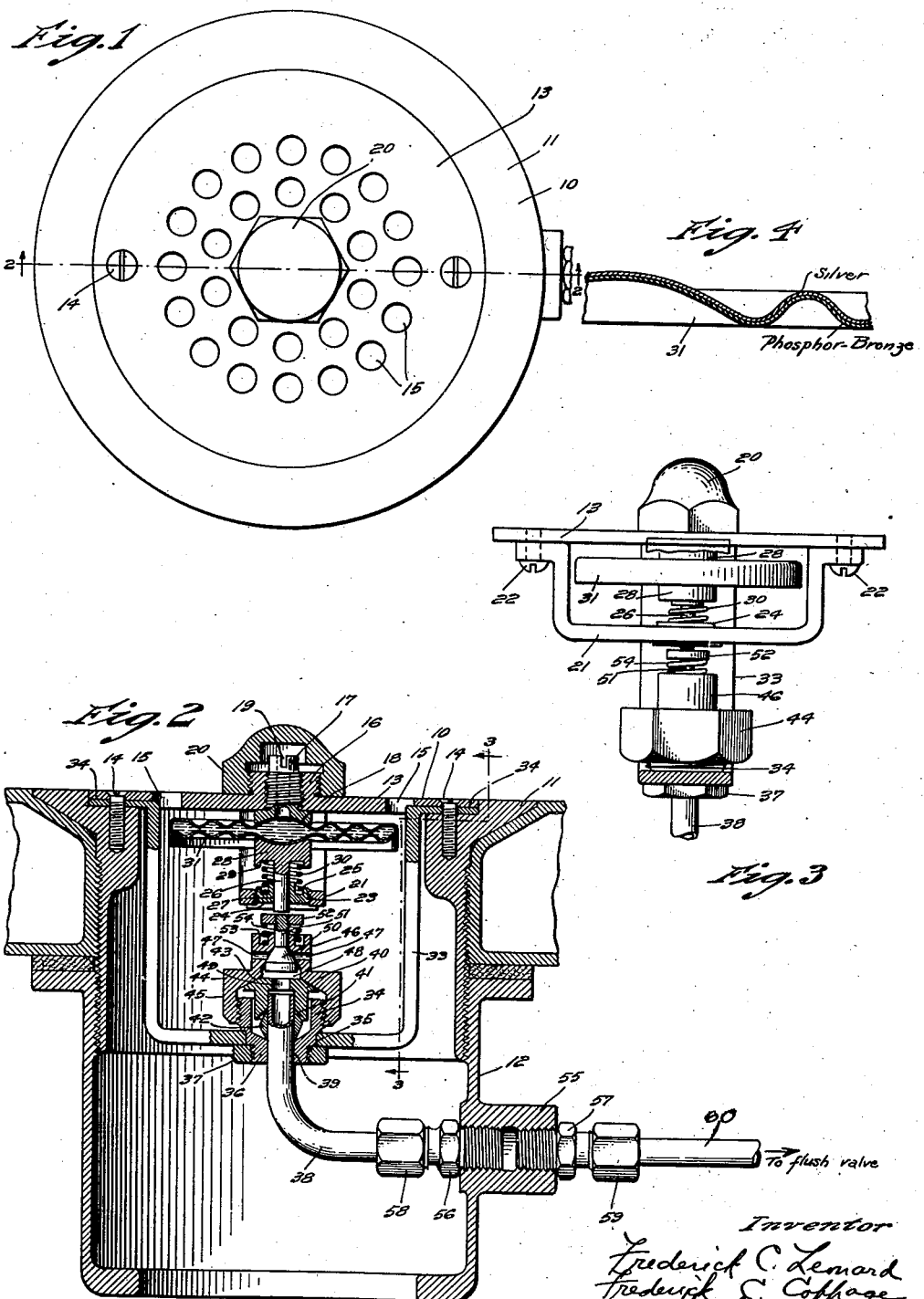
Inventor
Frederick C. Leonard
Frederick E. Coffage
By Nathaniel Frucht
Attorneys

Patented July 9, 1940

2,206,905

UNITED STATES PATENT OFFICE

2,206,905

FLOW CONTROL MECHANISM

Frederick C. Leonard and Frederick C. Coppage, Cranston, R. I., assignors to Leonard-Rooke Company, a corporation of Rhode Island Application October 31, 1936, Serial No. 108,526

3 Claims. (Cl. 137—139)

Our present invention relates to the valve art and has particular reference to a novel construction for a urinal valve.

Urinals have heretofore been flushed by means of manual operating buttons or foot pedals, but have not been automatically flushed, whereby cleanliness has been difficult to maintain.

The principal object of the invention is to provide a urinal valve construction which is automatically responsive to flow of fluid therethrough so as to properly clean the urinal, thus conserving water and ensuring adequate flushing.

A further object of the invention is to provide a construction that can be readily fitted to any standard size of urinal.

An additional object of our invention is to provide a simple and easily manufactured construction which cannot become clogged, and which may be readily assembled and remain in operative condition without constant attention.

With the above and other objects and advantageous features in view, our invention consists of a novel arrangement of parts more fully disclosed in the detailed description following, in conjunction with the accompanying drawing, and more specifically defined in the appended claims.

In the drawing:

Fig. 1 is a top plan view of the assembled valve and discharge apparatus;

Fig. 2 is a section on the line 2—2 thereof;

Fig. 3 is a view on the line 3—3 of Fig. 2; and

Fig. 4 is a sectional detail of the thermostatic element metal.

Referring to the drawing, the novel discharge and valve construction 10 comprises an outer housing 11 which fits into the usual opening in the base of the urinal, and is externally threaded to engage a correspondingly internally threaded discharge well 12 at the lower portion thereof, a packing washer of standard type being positioned between the upper end of the well and the base of the urinal. A central plate 13 is secured to the housing 11 in alignment therewith as by screws 14, and is provided with a plurality of flow openings 15; the plate 13 has a central upstanding flange 16, the flange and the plate having a central internally threaded bore to receive a threaded set screw element 17 which has a concave lower portion 18 as illustrated in Fig. 2 to form the upper seat for a thermostatic element.

The set screw element 17 is slotted as indicated at 19 to permit adjustment as hereinafter described, and the flanges 16 are outwardly threaded to receive a cap element 20 for covering the set screw element after its adjustment. A depending U-shaped frame 21, see Fig. 3 is attached to the lower surface of the plate 13 by means of screws or the like 22, and has a central opening 23 threaded to receive a spring retainer 24 which has an annular recess 25 in the upper surface thereof, a rod 26 being mounted in the central bore 27 of the retainer element and having a head 28 also provided with an annular recess 29, the two annular recesses being positioned towards each other and aligned, whereby a spring 30 may be positioned about the rod 26 and seated in the spring recesses 25 and 29. The head 28 is concave as disclosed in Fig. 2, to form a lower seat for a thermostatic element, whereby the thermostatic element 31, which is formed of thin flexible metal and contains an expansible fluid, may be retained between the two heads, the thermostatic element 31 being shaped at its central portion so as to snugly fit within the concave heads 18 and 28.

A second U-shaped support 33 depends from the undersurface of the plate 13, and preferably has end flanges 34 which seat in recesses provided in the lower portion of the plate 13, the holding screws 14 passing through openings in the flanges to lock the support in place. The depending support 33 carries a bleeder valve construction comprising a central bushing 34 having a reduced portion 35 seated in a suitable opening in the support 33, a further reduced portion 36 depending beneath the support and being threaded to receive a lock washer 37. A bleeder pipe or tube 38 connected to a standard type of bleeder flush valve, not shown, extends upwardly through a suitable opening 39 in the bushing 34, and a cap bushing 40 is seated thereon, having a bevelled lower edge 41 which contacts with a metal tubular packing sleeve 42, the head of the cap bushing 40 being bevelled as indicated at 43, whereby a valve housing 44 with a correspondingly bevelled lower surface and depending sides 45 for threadedly engaging exterior threads on the bushing 34, may seat to lock the cap firmly over the upper end of the bleeder pipe 38.

The valve housing 44 has an upstanding portion 46 which is provided with lateral ports 47 normally communicating with the central chamber 48, the cap bushing 40 having an opening 49 whereby the bleeder water may freely enter the chamber 48. The upper portion of the chamber 48 is conically tapered as illustrated in Fig. 2 to form a seat for a conical valve 50, which has a valve stem 51 extending outwardly therefrom and threaded to receive a head disk 52, the valve housing being recessed at its upper surface as indicated at 53 to permit a spring 54 to seat between the recess 53 and the underside of the head 52; the head 52 and the upper end of the valve rod 51 are thus in spaced proximity to the lower end of the element 26, which may be adjusted to provide a controlled spacing.

The parts are designed to facilitate mounting of the apparatus in any standard urinal fixture; for this purpose, the discharge well 12 has a boss 55, internally threaded to receive an inner tube connection 56 and an outer tube connection 57. A lock connection 58 having a standard pipe thimble is adapted to receive the lower end of the tube 38 and threadedly engage the connection 56, and a similar lock connection 59 is adapted to receive the end of a tube 60 which communicates with the flush valve housing. Since the well 12 and the housing 11 are threaded, it thus follows that any height of urinal can be accommodated, it being a simple operation to make the tube 38 of the proper length.

Moreover, it is desirable to make the thermostat of material not subject to corrosion by the flowing fluid, it has been found that a satisfactory metal for the purpose is obtained by welding a strip of phosphor bronze and silver, and rolling the welded strip. The thermostat casing is thus formed of metal having a silver outer layer to resist corrosion, and a phosphor bronze inner layer to obtain the desired spring effect and resilience necessary for continuous thermostatic action.

The operation of the device may now be explained.

The set screw element 17 is turned to obtain a desired clearance between the ends of the rod 26 and the upper end of the valve rod 51. When the urinal is used the hot fluid, at body temperature, passes downwardly through the openings 15 and contacts the thermostatic element 31, causing the thermostat fluid to expand and, to move rod 26 and depress the upper end of the valve stem 51 against the tension of the coil springs 30 and 54, whereby the valve 50 is lowered; the bleeder water in the tube 38 can now enter through the inlet 38 into the chamber 48 and out through the ports 47, thus causing operation of the main flush valve to flush the urinal. This flushing is automatic and continues as long as hot fluid passes downwardly in contact with the thermostatic element 31, the flush water thus thoroughly cleaning the urinal base. When the temperature drops, due to continued flow of the flush water, the thermotatic element 31 contracts and the valve 50 moves upwardly under the influence of its spring 54 to stop the flow of flush water.

The present invention thus provides an automatic valve construction for flushing urinals immediately after use, whereby the urinals are kept clean and waste of water is prevented. Moreover, the construction of the parts permits use with any standard size of urinal, and does not require export or special mounting, as the various parts do not need to fit to close limits in order to obtain the desired results. The construction thus facilitates manufacture, assembly, and mounting, and ensures long life and trouble-free operation.

While we have described a specific construction suitable for use as a urinal valve, it is obvious that the invention may be utilized for other flush controls, or for control of temperature of flowing fluids, the operation being entirely automatic. Changes in the construction and shape of the parts and in their relative arrangement may be made to suit the requirements for different flushing or fluid control devices, without departing from the spirit and the scope of the invention as defined in the appended claims.

We claim:

1. A thermostatic control for a discharge well, comprising a housing having a cover plate provided with flow openings, a support device depending from said housing, a fluid conduit connected in said support and having a valve for controlling flow therefrom, thermostatic mechanism comprising two spaced disk elements and containing an expansible fluid mounted in said housing in parallel relation to said cover and directly below the flow openings, and means for moving said valve to open position upon movement of said thermostatic mechanism when contacted by warm fluid passing through said openings.

2. A thermostatic control for a discharge well, comprising a housing having an upper portion and a lower portion detachably secured thereto, said upper portion having a cover with flow openings, and said lower portion having fluid conduit connection means, a support device depending from said upper portion, a fluid conduit secured to said support device and said fluid conduit connection means and having an outflow control valve, and thermostatic means mounted in said upper portion and movable to open said control valve upon passage of warm fluid through said flow openings.

3. A thermostatic control for a dischage well, comprising a housing having a cover plate provided with flow openings, a support device depending from said housing, a fluid conduit connected in said support and having a valve for controlling flow therefrom, thermostatic mechanism comprising two spaced disk elements and containing an expansible fluid mounted in said housing in parallel relation to said cover and directly below the flow openings, and means for moving said valve to open position upon movement of said thermostatic mechanism when contacted by warm fluid passing through said openings, said thermostatic disk elements comprising an inner layer of metal having a high resilience and an outer layer of silver.

FREDERICK C. LEONARD.
FREDERICK C. COPPAGE.